United States Patent [19]
Manz et al.

[11] Patent Number: 5,551,247
[45] Date of Patent: Sep. 3, 1996

[54] REFRIGERANT HANDLING SYSTEM AND METHOD ESPECIALLY FOR FLAMMABLE AND POTENTIALLY FLAMMABLE REFRIGERANTS

[75] Inventors: Kenneth W. Manz, Paulding; Allan F. Heisler, II; Gary P. Murray, both of Montpelier; Walter D. Murray, Pioneer; Daniel L. Olds, Bryan, all of Ohio

[73] Assignee: SPX Corporation, Muskegon, Mich.

[21] Appl. No.: 315,836

[22] Filed: Sep. 30, 1994

[51] Int. Cl.⁶ .................................................. F25B 45/00
[52] U.S. Cl. ............................................ 62/149; 62/292
[58] Field of Search ............................. 62/72, 292, 149, 62/126; 417/306

[56] References Cited

U.S. PATENT DOCUMENTS 5,020,331  6/1991  Michny ........................................ 62/292

Primary Examiner—John M. Sollecito
Attorney, Agent, or Firm—Barnes, Kisselle, Raisch, Choate, Whittemore & Hulbert

[57] ABSTRACT

A refrigerant handling system that is particularly adapted for flammable or potentially flammable refrigerants that includes a compressor having an inlet for connection to a source of refrigerant, and a condenser connected to the outlet of the compressor for at least partially condensing refrigerant passing therethrough. An air motor is connected to a source of air under pressure for operating the compressor. The air from the motor exhaust is directed to the condenser for cooling the condenser and thereby enhancing extraction of heat from refrigerant passing through the condenser.

8 Claims, 3 Drawing Sheets

REFRIGERANT HANDLING SYSTEM AND METHOD ESPECIALLY FOR FLAMMABLE AND POTENTIALLY FLAMMABLE REFRIGERANTS

The present invention is directed to refrigerant handling systems and methods, and more particularly to a system and method for recovering flammable and potentially flammable refrigerants from equipment under service.

BACKGROUND AND OBJECTS OF THE INVENTION

Proliferation of refrigerants for refrigeration systems, such as air conditioning and heat pump systems, increases the likelihood that the refrigerant in a particular system may be different than expected. Mixing of refrigerant types, and consequent refrigerant contamination, must be avoided. Steps have been taken in some industries, such as the motor vehicle industry, to prevent mixing and contamination of refrigerants by requiring different service fittings, and separate recycling and service equipment, for different refrigerant types. U.S. Pat. Nos. 5,158,747 and 5,295,360, both assigned to the assignee hereof, disclose instruments for identifying refrigerant type prior to initiating service on the refrigeration equipment, and thereby helping to avoid mixing and contamination of refrigerants.

A problem that must be addressed, however, lies in the handling of flammable refrigerants, such as hydrocarbon refrigerants, and refrigerants that may have become flammable through mixing and contamination. It is conventional practice in systems for recovering refrigerants from equipment under service, and in other refrigerant handling systems, to employ an electrically operated refrigerant compressor and one or more electrically operated solenoid valves for controlling flow of refrigerant through the compressor. U.S. Pat. Nos. 4,261,178, 4,768,347, 5,211,024 and 5,261,249, all assigned to the assignee hereof, illustrate technology of this character. It is a general object of the present invention to provide a system and method for handling flammable refrigerants such as hydrocarbons, or contaminated refrigerants that may be flammable, that does not employ or require electrical power at the refrigerant compressor or at any of the components in the refrigerant flow path.

SUMMARY OF THE INVENTION

A refrigerant handling system that is particularly adapted for flammable or potentially flammable refrigerants in accordance with the present invention includes a compressor having an inlet for connection to a source of refrigerant, and a condenser connected to the outlet of the compressor for at least partially condensing refrigerant passing therethrough. A fluid motor is connected to a source of fluid power for operating the compressor. The fluid motor in the preferred embodiments of the invention comprises an air motor connected through a pressure regulator to a source of air under pressure, and the air from the motor exhaust is directed to the condenser for cooling the condenser and thereby enhancing extraction of heat from refrigerant passing through the condenser.

The compressor inlet is connected to the refrigerant source in one embodiment of the invention by a pressure regulator for limiting maximum suction pressure at the compressor inlet, and thereby helping to prevent stalling of the compressor and air motor. A three-way valve has a first position for blocking inlet to the compressor, a second position for connecting the compressor inlet to the refrigerant source, and a third position for connecting the compressor inlet to ambient air through an orifice to facilitate starting of the compressor. A valve is also connected across the compressor between the compressor inlet and outlet for relieving pressure across the compressor and thereby facilitating starting of the compressor and the air motor. A valve is also disposed between the condenser outlet and the refrigerant destination, such as a refrigerant storage container. Preferably, all of the valves are manually operable, so that no electrical power is employed in the refrigerant flow path.

In another embodiment of the invention, the compressor is relatively small as compared with the air motor, eliminating the need for the three-way inlet valve, the orifice and the equalization valve to assist starting of the compressor. This embodiment also features a condenser arrangement comprising a parallel tube or tube-in-tube arrangement for heat exchange between refrigerant and exhaust air from the motor. The air is then directed onto the compressor for cooling the compressor. A scale for mounting a refrigerant recovery container is coupled to the air inlet valve for terminating application of air to the motor when weight of refrigerant in the container exceeds the desired maximum level. The valve is manually reset by an operator after the container is replaced.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
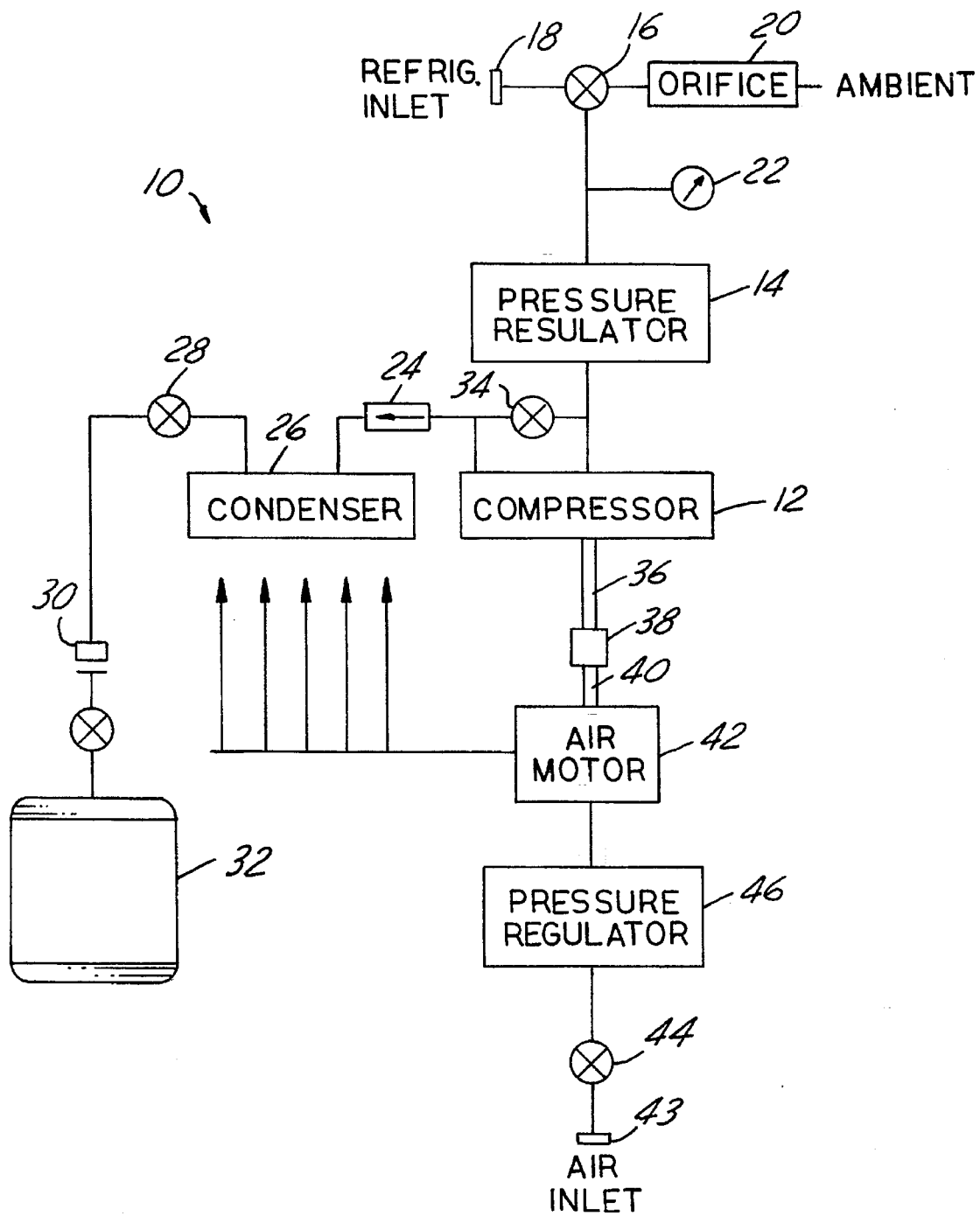
FIG. 1 is a schematic diagram that illustrates one presently preferred embodiment of a refrigerant handling system in accordance with the present invention.

FIG. 1 illustrates a refrigerant handling system 10 in accordance with one presently preferred embodiment of the invention as comprising a compressor 12 having an inlet connected through a pressure regulator 14 and a three-way manual valve 16 to a coupling 18 for connection to a source of refrigerant, such as refrigeration equipment from which refrigerant is to be recovered. Valve 16 has a third port connected to ambient air through an orifice 20. A pressure gauge 22 is connected between valve 16 and pressure regulator 14. The outlet of compressor 12 is connected through a check valve 24, a condenser 26 and a manual valve 28 to a coupling 30 for connection to a refrigerant destination, such as the valved port of a refrigerant storage container 32. A manual valve 34 is connected across compressor 12 between the compressor inlet and outlet.

Compressor 12 has an input shaft 36 connected by a coupling 38 to the output shaft 40 of an air motor 42. Air motor 42 receives air under pressure from a suitable source, such as a shop air compressor, through an inlet fitting 43, a manual valve 44 and a pressure regulator 46. Pressure regulator 46 limits speed of operation of motor 42 and compressor 12. The re-expanding exhaust from air motor 42 is directed onto and over condenser 26, which preferably comprises a conventional tube-type condenser having cooling fins for enhanced heat exchange with air passing therethrough. Air motor 42 may be of any suitable conventional type, such as a Model No. 2AM-NCC-16 (¾HP) motor marketed by Gast Manufacturing Corporation of Benton Harbor, Mich. Compressor 12 preferably comprises an oilless compressor, such as marketed by Thomas Industries, Inc. of Sheboygan, Wis. Orifice 20 may be of any suitable size, such as 0.020 inches.

In operation, valves 28,44 are initially closed, valve 34 is initially opened, and valve 16 is initially placed in a position connecting orifice 20 to pressure regulator 14. When valve 44 is then opened to feed air under pressure to motor 42, compressor 12 is started by drawing ambient air through orifice 20. Orifice 20 prevents intake of excessive quantities of air, which must later be purged from the storage container. When air motor 42 and compressor 12 are operating at full speed, valve 34 is closed, valve 28 is opened, and valve 16 is placed in the position connecting coupling 18 and the equipment under service to pressure regulator 14 and compressor 12. Compressor 12 withdraws refrigerant in vapor phase from the equipment under service. Pressure regulator 14 limits the maximum suction pressure (e.g., 25 psig) so that motor 42 will not stall as refrigerant is being recovered. Refrigerant from compressor 12 is fed through check valve 24 and condenser 26, in which the refrigerant is at least partially condensed by heat extraction enhanced by flow of exhaust air from motor 42 over the condenser. The condensed or partially condensed refrigerant is fed to storage container 32. When gauge 22 indicates that all refrigerant has been recovered from the equipment under service, valve 16 is placed in the position blocking the refrigerant inlet path, and valve 28 is closed.

There is thus provided in accordance with the present invention a system and method for handling refrigerant, and particularly for recovering refrigerant from refrigeration equipment under service, that fully satisfies all of the objects and aims previously set forth. In particular, the use of air motor 42 to power compressor 12, and the use of manual valves 16,28,34,44, eliminates all electrical power from the refrigerant flow path, making the system and method of the present invention particularly well suited for recovering or otherwise handling flammable or potentially flammable refrigerants. It will be recognized, of course, that air motor 42 could be replaced by other suitable fluid-powered motors, such as a hydraulic motor. Fluid-operated valves could be employed at 16,28,34,44, and could be made automatically responsive to pressure conditions in the refrigerant flow path, without departing from the principles of the present invention.

Figure 2:
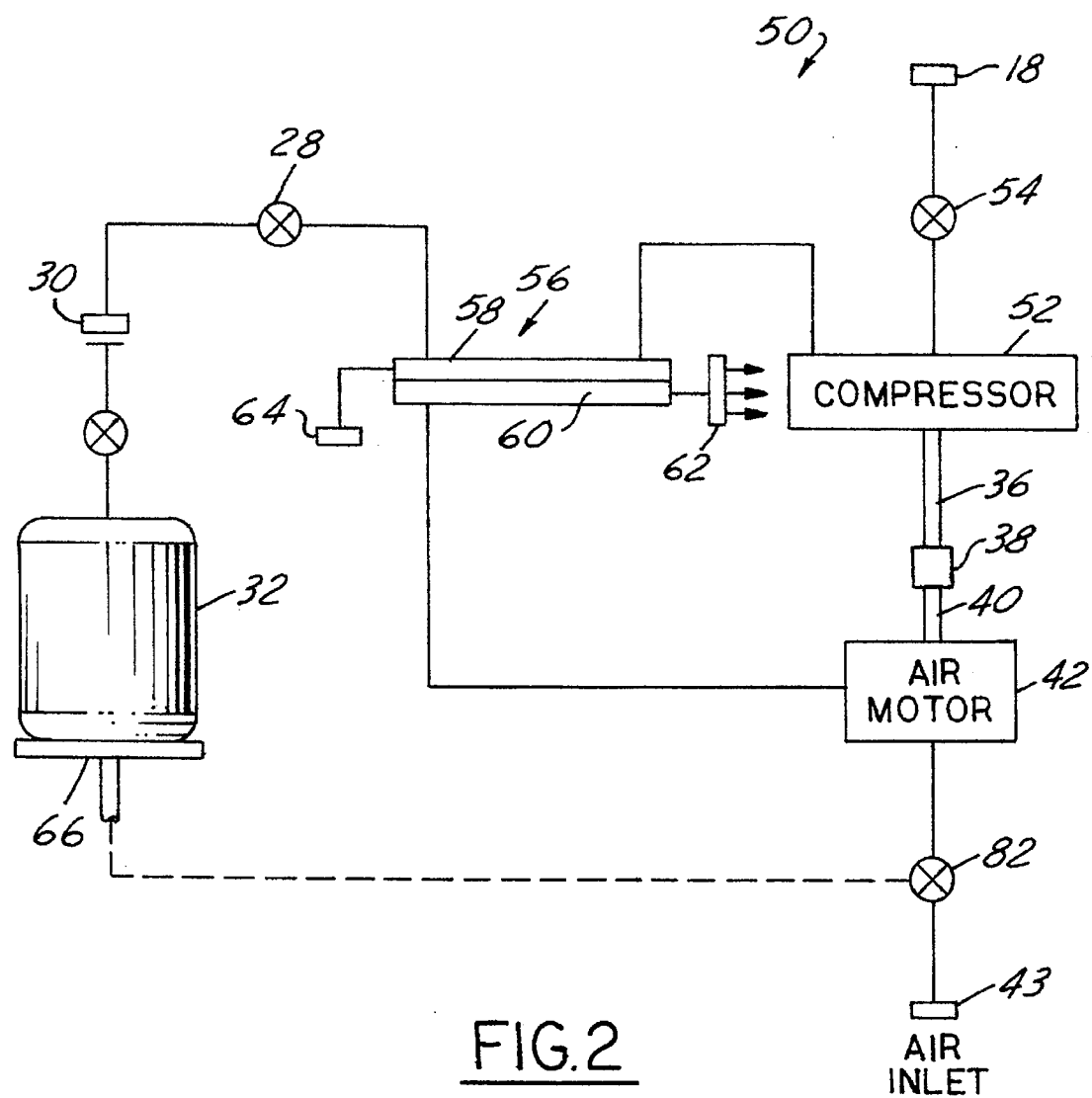
FIG. 2 is a schematic diagram of a second embodiment of the invention.
Figure 3:
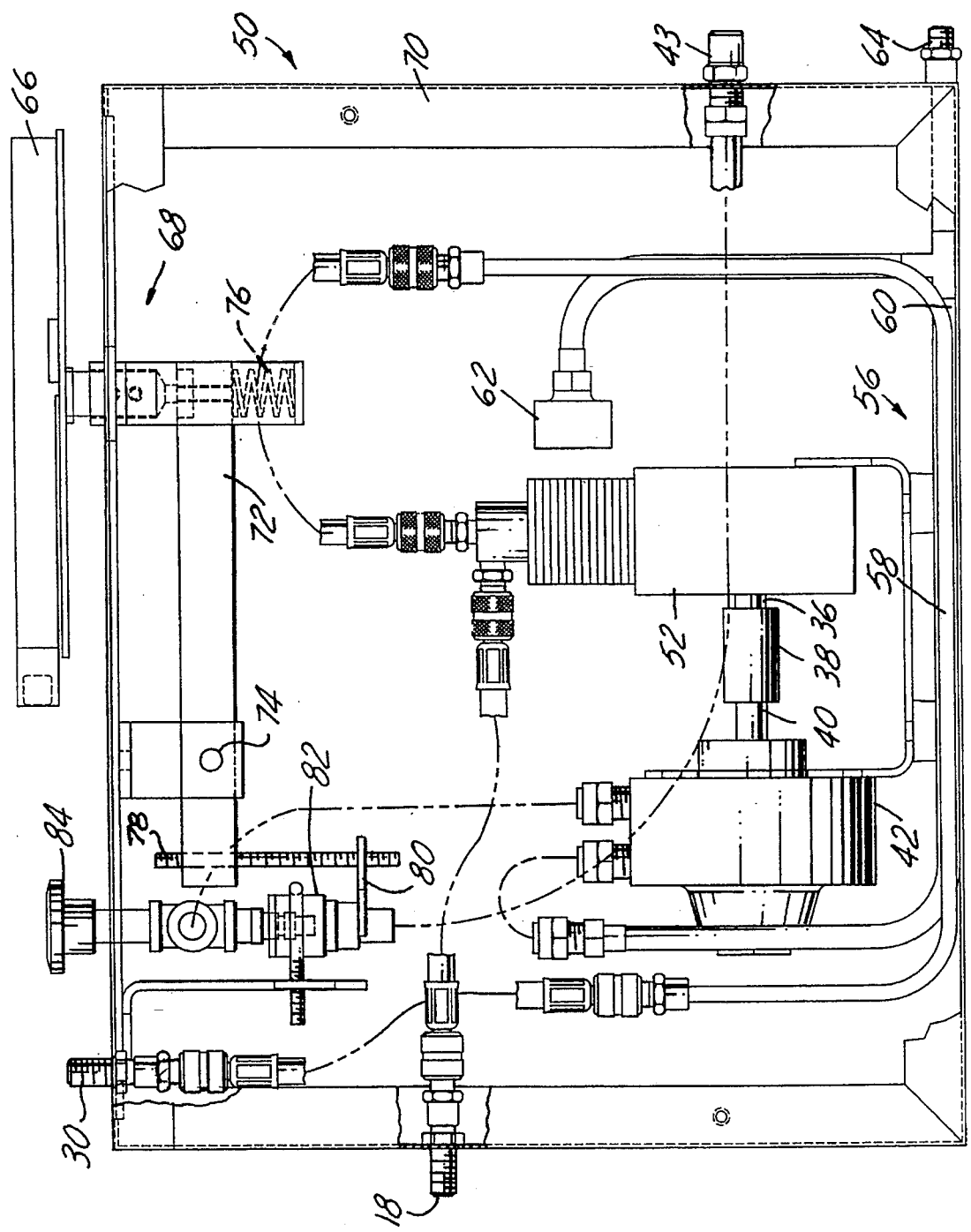
FIG. 3 is a fragmentary elevational view of the embodiment of the invention illustrated in FIGS. 2.

FIGS. 2 and 3 illustrate a second embodiment 50 of the invention, in which identical reference numerals are employed to indicate elements that are the same as in FIG. 1. Compressor 52 in the embodiment of FIGS. 2 and 3 is smaller than in the embodiment of FIG. 1. Air motor 42 is therefore larger relative to the compressor, and pressure regulator 14, orifice 20 and valve 34, which ease starting of the compressor in FIG. 1, may be eliminated. Three-way valve 16 (FIG. 1) is replaced with an on/off valve 54. The condenser 56 in FIGS. 2 and 3 comprises parallel tubes 58,60 (or a tube-in-tube arrangement) in which the tubes are in heat exchange with each other. Re-expanding air from motor 42 flows through tube 60 for heat exchange with refrigerant flowing through tube section 58. The air is then fed through an outlet 62 onto compressor 52 to cool the compressor. An oil drain 64 is also connected to tube section 60.

Refrigerant storage container 32 is mounted on the platform 66 of a scale arrangement 68 on the top of the system cabinet 70. Platform 66 is carried within cabinet 70 by a scale beam 72. Beam 72 is mounted on a pivot 74, and is biased upwardly beneath platform 66 by a coil spring 76. The opposing end of beam 72 is coupled by a threaded adjustment shaft 78 to the trip lever 80 of an air coupler valve 82. Valve 82 is connected between air inlet 43 and motor 42. Weight of refrigerant within container 32 urges beam 72 to pivot clockwise in FIG. 3 against the force of spring 76. When such motion reaches the trip point of lever 80 and valve 82, set by threaded shaft 78, flow of air to motor 42 is interrupted. Thus, refrigerant recovery is terminated when weight of refrigerant reaches the preset threshold. After container 32 has been replaced, operation may resume by activation of manual reset knob 84.

We claim:

1. A refrigerant recovery system that comprises:

a cabinet, a compressor disposed within said cabinet having an inlet for connection to a source of refrigerant external to said cabinet and an outlet, a condenser disposed within said cabinet, including means connecting an inlet of said condenser to said compressor outlet for at least partially condensing refrigerant passing through said condenser from said compressor outlet and means for connecting an outlet of said condenser to a refrigerant storage container outside of said cabinet, a fluid motor within said cabinet operating coupled to power said compressor, valve means disposed on a wall of said cabinet for connection to a source of fluid under pressure outside of said cabinet and coupled to said motor for applying fluid to power said motor, and a scale carried by said cabinet, including a platform disposed outside of said cabinet for supporting the refrigerant storage container connected to said condenser outlet connecting means, and means disposed within said cabinet operatively coupling said platform to said valve means such that weight of the storage container and refrigerant therein above a preselected level functions to close said valve means and terminate operation of said fluid motor and said compressor.

2. The system set forth in claim 1 wherein said means operatively coupling said platform to said valve means comprises a beam pivotally mounted with said cabinet and operatively coupled to said valve means, said platform being supported by said beam.

3. The system set forth in claim 2 further comprising spring means disposed within said cabinet in engagement with said beam in opposition to weight of said platform and of the refrigerant storage container carried by said platform.

4. The system set forth in claim 3 wherein said beam is operatively coupled to said valve means by means for adjusting said preselected weight level at which said scale closes said valve means.

5. The system set forth in claim 4 wherein said valve means includes means carried by said cabinet outside of said cabinet for reopening said valve means after closure of said valve means by said scale.

6. The system set forth in claim 1 wherein said condenser comprises a fluid cooled condenser, and wherein said system further comprises means for directing exhaust fluid from said motor for heat exchange with refrigerant flowing through said condenser.

7. The system set forth in claim 6 wherein said condenser and said means for directing exhaust fluid for heat exchange with refrigerant flowing through said condenser comprise respective tubes in heat exchange with each other and disposed within said cabinet.

8. The system set forth in claim 7 further comprising an oil drain disposed on a wall of said cabinet and coupled to said exhaust fluid tube.

* * * * *